United States Patent Office 3,647,795
Patented Mar. 7, 1972

3,647,795
VAPOR PHASE PROCESS FOR PRODUCTION OF N,N'-DISUBSTITUTED PIPERAZINES
Bernard R. Bluestein, Glen Rock, and Jack M. Solomon, West Caldwell, N.J., assignors to Witco Chemical Company, Inc., New York, N.Y.
No Drawing. Filed Jan. 10, 1968, Ser. No. 696,707
Int. Cl. C07d 51/70
U.S. Cl. 260—268 SY          6 Claims

ABSTRACT OF THE DISCLOSURE

N,N'-disubstituted piperazines are prepared in a vapor phase process at atmospheric pressure by cyclodehydration of the corresponding N-substituted ethanolamine in the presence of an activated alumina catalyst.

---

This invention relates to a novel catalytic vapor phase process for producing N,N'-disubstituted piperazines in high yields at atmospheric pressure, and is especially concerned with the utilization of activated alumina as a selective catalyst for cyclodehydrating N-substituted ethanolamines to produce the corresponding N,N'-disubstituted piperazines.

The preparation of piperazines and various derivatives thereof by cyclization reactions, some of which are vapor phase processes, is known to the art, as is disclosed, for example, in U.S. Pat. No. 3,067,199, wherein a primary alkanolamine is brought into contact with nickel or cobalt catalysts; U.S. Pat. No. 2,400,022 in which a hydroxethyl ethylenediamine in liquid phase is cyclized to a piperazine in yields of 13 to 50% at conditions of elevated temperature and at atmospheric or superatmospheric pressures; and U.S. Pat. 2,427,473 wherein certain hydroxy amines are reacted in the presence of an activated alumina catalyst so as to produce piperazines.

Generally speaking, heretofore known processes for the manufacture of N,N'-disubstituted piperazines have been characterized by one or more disadvantages such as requiring relatively expensive starting materials, or high pressure reaction conditions, or resulting in low yields. Thus, for instance, in U.S. Pat. No. 3,029,240 in which a methylated polyalkylene polyamine is contacted with an acidic silica-alumina catalyst at slightly elevated pressures, and U.S. Pats. Nos. 3,037,025 and 3,120,524 both of which describe high pressure techniques, low yields of the N,N'-dialkyl piperazines are obtained as, for example, of the order of up to 22%. In U.S. Pat. No. 2,868,791, N,N'-disubstituted piperazines are produced in yields stated to be of the order of 30–49% or more, using hydroxethyl secondary amines as starting materials, but both high pressures and an aqueous solution of the amine saturated with carbon dioxide are critical for the process.

So far as we are aware, no satisfactory process has heretofore been known for producing N,N'-disubstituted piperazines at atmospheric pressure by a simple, catalytic vapor phase procedure using the corresponding N-substituted ethanolamine as the starting material. While a number of the prior art piperazine processes disclose the use of activated alumina as a catalyst, none of such processes discloses or suggests the unexpected functioning or peculiar ability of activated alumina to selectively cyclodehydrate N-substituted ethanolamines at atmospheric pressure.

In accordance with the present invention it has been discovered that N,N'-disubstituted piperazines can be prepared by a vapor phase process at atmospheric pressure by passing the vapors of a compound of the formula $RNHCH_2CH_2OH$, where R represents unsubstituted or substituted alkyl and alkylene radicals having from 1 to 18 carbon atoms, over an activated alumina catalyst so that cyclodehydration occurs to form the corresponding N,N'-dialkyl piperazine. The cyclodehydration reaction is represented by the following equation

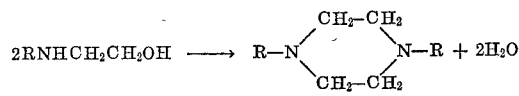

Essential to the practice of the present invention is the utilization of an activated alumina catalyst, and more particularly and advantageously a high surface area activated alumina catalyst. Especially effective is such a catalyst having a surface area in the order of at least about 350 m.²/g. and, better still, greater surface areas. While it is possible to carry out the cyclodehydration reaction using a lower surface area activated alumina catalyst, a much longer residence time of N-substituted ethanolamine in the reaction zone is necessary, and the full economic advantages of our process will, accordingly, not be obtained because of the additional time required. One illustrative suitable commercially available activated alumina catalyst for the practice of the present invention is that sold as 1/8" spheres under the designation "H–151" (Aluminum Company of America) having the following properties: Surface area: 350 m.²/gram; Composition: $Al_2O_3$ 86%, $Na_2O$ 1.0%, $Fe_2O_3$ 0.15%, $SiO_2$ 6.3%; Loss on ignition: 6.2% at 1100° C.; Sp. gr.: 3.1–3.3.

The efficacy of activated alumina catalysts, such as the foregoing, in producing N,N'-dialkyl piperazines in a vapor phase procedure at atmospheric pressure is especially surprising, since the same catalyst has been found quite ineffective in producing an apparently simpler compound, namely, unsubstituted piperazine, in good yields at atmospheric pressure. Numerous other catalysts were also found not suitable for cyclodehydrating N-alkyl ethanolamines in the vapor phase at atmospheric pressure, thus indicating the peculiar effectiveness of activated alumina catalysts in the process of the present invention. These unsuitable catalysts include silica alumina, silica gel, gamma-alumina, tungsten and tantalum on silica alumina, molecular sieves, boric oxide on silica alumina, and cadmium oxide on silica alumina.

Although activated aluminas as such are highly effective as catalysts for the practice of our invention, it should be understood that said catalysts may contain minor amounts of catalyst modifiers without departing from the practice of the process of the present invention. Thus, by way of illustration, materials such as boric anhydride or calcium oxide may be added to or incorporated with the activated alumina and, in certain cases, the use of such modified catalysts results in an increase of yield of the N,N'-disubstituted piperazines.

The N-substituted ethanolamines which comprise the starting materials in the practice of the present invention include not only the lower alkyl substituted N-alkyl ethanolamines which undergo cyclodehydration readily, but, also, the said compounds wherein an alkyl substituent group is in the order of up to about 18 carbon atoms, which, it has also been found, react at atmospheric pressure to form the corresponding N,N'-disubstituted piperazines.

The substituent group attached to the ethanolamine nitrogen is most desirably unsubstituted alkyl or alkylene, but said alkyl or alkylene can be substituted with functional groups such as halogen, amino, acetyl, nitro, hydroxy, carboxy, epoxy, thio, and the like, the only limitation being that any functional group does not deleteriously affect the reaction or the catalyst through unwanted side reactions.

Illustrative examples of N-substituted ethanolamines useful as starting materials for the practice of the process of our invention are N-methylethanolamine, N-ethylethanolamine, N-butylethanolamine, N-isobutylethanolamine, N-isopropylethanolamine; N-acetylethanolamine, and N-aminopropylethanolamine. Still others can be represented by the general formulas RNHCH$_2$CH$_2$OH and

HR'NHCH$_2$CH$_2$OH, where R represents a C$_8$ to C$_{18}$ alkyl wherein the terminal carbon is attached to the nitrogen, and R' represents those alkylation products wherein the nitrogen is attached to a secondary carbon atom. With these compounds, it has been found that, for example, R' can represent a particular alkyl from C$_8$ to C$_{18}$, such as octyl or dodecyl, or it may be a mixture of alkyl groups. N-substituted ethanolamines containing a mixture of alkyl groups are usually produced when the source of the alkyl is a petroleum fraction containing paraffins of varying chain length, such as kerosene. It has been found that activated alumina will effectively cyclodehydrate an N-substituted ethanolamine where the alkyl substituent is made up of a number of alkyl radicals of varying chain length to form the corresponding N,N'-disubstituted piperazine adduct. Preferred materials of this latter type include those products in which the alkyl group is a normal paraffin having an average of about C$_{11.5}$.

Generally the process of the present invention involves vaporizing the N-substituted ethanolamine and using a carrier gas to bring the vapors into contact with the activated alumina catalyst in a suitable reaction vessel. The practice of the present invention does not require the use of any particular apparatus. All that is necessary is a suitable means for passing the material in vapor form over the catalyst. The reacted vapors are condensed and collected using conventional equipment. The apparatus may be varied at will as long as the intended function is accomplished. Conditions such as temperature and contact time are variable, depending on the particular materials being used so as to optimize the yield. Generally speaking, the process is carried out at about 500–800° F. with a contact time of about 10–100 seconds, since, ordinarily, under these conditions, the N,N'-dialkyl piperazines are produced in superior yields.

Any inert carrier gas which does not interfere with the reaction process is suitable for the practice of the present invention. The primary function of the gas is to serve as a diluent medium in transporting the amine vapors to the reaction zone and enable cyclodehydration to occur under reasonably optimum conditions. Gases preferred in the practice of this invention are hydrogen and nitrogen. Examples of other suitable gases are argon and helium. The relative quantity of carrier gas to be used is a function of what contact time is desired for the particular N-substituted ethanolamine being employed. Generally speaking, for lower molecular weight N-alkyl ethanol amines, such as N-methyl ethanolamine, the ratio of carrier gas to said amine is desirably about 3 moles to 1 mole. For the higher molecular weight compounds, the ratio is desirably about twice as much.

The invention is further illustrated but not limited by the following examples wherein all percentages stated are by weight and all temperatures stated are in degrees F.

EXAMPLE I

N-methylethanolamine was vaporized and passed into a 3 ft. x 25 mm. reactor tube, utilizing nitrogen as a carrier gas. The reaction was carried out at 515° and at atmospheric pressure. The tube contained about 175 cc. of activated alumina catalyst having a surface area of 350 m.$^2$/g. The N-methylethanolamine was metered into the tube so as to obtain a contact time of 100 seconds. The reaction effluent was collected and examined by vapor phase chromatography for constituent analysis. The results showed a 94% conversion with a 75% yield of N,N'-dimethyl piperazine.

EXAMPLE II

Example I was repeated except that the reaction temperature was 600° and the N-methylethanolamine was metered into the reaction tube so as to establish a contact time of 10 seconds. A 41% yield of N,N'-dimethyl piperazine was obtained with a 87% conversion of the N-methylethanolamine feed.

EXAMPLE III

Example I was repeated except that the temperature was 800° and the contact time was 1 second. A 31.5% yield of N,N'-dimethyl piperazine was obtained with a 93% conversion of N-methylethanolamine.

EXAMPLE IV

Example I was repeated at a temperature of 800° utilizing hydrogen carrier gas and a contact time of 1 second. A 30.2% yield of N,N'-dimethyl piperazine was obtained with a 92.0% conversion of the N-methylethanolamine.

EXAMPLE V

Utilizing nitrogen as a carrier gas, N-butylethanolamine vapors were passed into the reactor tube at a temperature of 700° with a contact time of 10 seconds. Activated alumina catalyst with a 350 m.$^2$/g. was employed. Conversion in excess of 95% with a 70% yield of N,N'-dibutyl piperazine was obtained.

EXAMPLE VI

A high molecular weight N-alkyl ethanolamine in which the alkyl radicals averaged C$_{11.5}$ and in which the alkyl radicals varied from 8 to 18 carbon atoms was prepared from a petroleum fraction source consisting essentially of n-paraffins or, in other words, the starting material was represented by the general formula

HR'NHCH$_2$CH$_2$OH where R' represents the range of alkyls noted above. This N-alkyl ethanolamine was then cyclodehydrate in the presence of nitrogen carrier gas at atmospheric pressure following the procedure outlined in Example I. At a temperature of 500° and a contact time of 20 seconds, there was essentially complete conversion of the N-alkyl ethanolamine with an approximately 42% yield of the N,N'-dialkyl piperazine.

What is claimed is:

1. A process for producing N,N'-disubstituted piperazines of the general formula

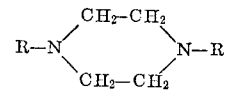

which comprises vaporizing an N-substituted ethanolamine of the formula RNHCH$_2$CH$_2$OH where R represents unsubstituted or substituted alkyl radicals having from 1 to 18 carbon atoms, passing the vapors over an activated alumina catalyst at atmospheric pressure to condense two molecules of said N-substituted ethanolamine so that cyclodehydration of the N-substituted ethanolamine occurs, and separating the N,N'-disubstituted piperazines.

2. A process according to claim 1, where R represents an alkyl radical having from 1 to 4 carbon atoms.

3. A process according to claim 2, wherein the activated alumina catalyst has a surface area of at least about 350 m.$^2$/g.

4. A process according to claim 3, wherein the cyclodehydration is carried out at a temperature of about 500° F. to 800° F.

5. A process according to claim 3, wherein the cyclodehydration is carried out in the presence of an inert carrier gas.

6. A process according to claim 5, wherein the inert carrier gas is selected from the group of hydrogen and nitrogen.

References Cited

UNITED STATES PATENTS

| | | | |
|---|---|---|---|
| 2,427,473 | 9/1947 | Pfann | 260—268 |
| 3,369,019 | 2/1968 | Hamilton | 260—268 |
| 3,383,417 | 5/1968 | Lichtenwalter | 260—268 X |
| 3,532,646 | 10/1970 | Antikow | 260—268 SY |

FOREIGN PATENTS

| | | | |
|---|---|---|---|
| 166,033 | 11/1964 | Russia | 260—268 |

DONALD G. DAUS, Primary Examiner

U.S. Cl. X.R.

260—584 R